United States Patent
Ahrendt

(10) Patent No.: US 9,046,386 B2
(45) Date of Patent: Jun. 2, 2015

(54) STRUCTURAL UNIT OF A ROTARY ENCODER, AND METHOD FOR PRODUCING THIS STRUCTURAL UNIT

(75) Inventor: Dirk Ahrendt, Chieming (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 490 days.

(21) Appl. No.: 13/412,799

(22) Filed: Mar. 6, 2012

(65) Prior Publication Data

US 2012/0229799 A1  Sep. 13, 2012

(30) Foreign Application Priority Data

Mar. 10, 2011 (DE) .......................... 10 2011 005 351

(51) Int. Cl.
  *G01B 11/14* (2006.01)
  *G01D 5/347* (2006.01)

(52) U.S. Cl.
  CPC .................................. *G01D 5/34707* (2013.01)

(58) Field of Classification Search
  CPC .................................................. G01D 5/3473
  USPC ............... 250/231.13–231.18, 237 R, 237 G; 356/614–620
  See application file for complete search history.

(56) References Cited

U.S. PATENT DOCUMENTS

| 4,102,028 | A | * | 7/1978 | Currie .......................... 29/281.5 |
| 5,146,084 | A |   | 9/1992 | Asaba et al. |
| 5,377,044 | A | * | 12/1994 | Tomono et al. ............... 359/566 |
| 6,255,644 | B1 | * | 7/2001 | Taniguchi et al. ....... 250/231.13 |
| 2008/0177139 | A1 | * | 7/2008 | Courtney et al. ............. 600/109 |

FOREIGN PATENT DOCUMENTS

EP  0 386 268 B1  7/1994

* cited by examiner

*Primary Examiner* — Kara E Geisel
*Assistant Examiner* — Hina F Ayub
(74) *Attorney, Agent, or Firm* — Brinks Gilson & Lione

(57) ABSTRACT

A structural unit for a rotary encoder. The structural unit including a graduation carrier fastened to a mount that includes a recess and a positioning element fastened to the graduation carrier by a first material connection. The positioning element is disposed in the recess, and the recess is dimensioned such that the recess positions the positioning element in a radial direction without play. The structural unit further including a second material connection is provided between the graduation carrier and the mount.

12 Claims, 4 Drawing Sheets

STRUCTURAL UNIT OF A ROTARY ENCODER, AND METHOD FOR PRODUCING THIS STRUCTURAL UNIT

RELATED APPLICATIONS

Applicant claims, under 35 U.S.C. §119, the benefit of priority of the filing date of Mar. 10, 2011 of a German patent application, copy attached, Serial Number 10 2011 005 351.4, filed on the aforementioned date, the entire contents of which is incorporated herein by reference.

BACKGROUND

1. Technical Field

The present invention relates to a structural unit of a rotary encoder.

2. Background Information

An example of such structural unit is described in European patent disclosure EP 0 386 268 B1. In it, it was already acknowledged to be known to fasten a graduation carrier to a mount by using an adhesive bonding on the mount applied to the underside of the graduation carrier, so that a central hole in the graduation carrier is not required.

A disadvantage of this is that the positioning between the graduation carrier and the mount is difficult to achieve. In most cases, a drive shaft of a drive unit, especially of a drive motor, serves as the mount, so that the fastening of the graduation carrier is not done by the manufacturer of the graduation carrier or of the rotary encoder, but only by the manufacturer of the drive unit.

OBJECTS AND SUMMARY OF THE INVENTION

It is therefore an object of the present invention to disclose a structural unit for a rotary encoder which makes simple, stable assembly of a graduation carrier possible.

This object is attained according to the present invention by a structural unit for a rotary encoder. The structural unit including a graduation carrier fastened to a mount that includes a recess and a positioning element fastened to the graduation carrier by a first material connection. The positioning element is disposed in the recess, and the recess is dimensioned such that the recess positions the positioning element in a radial direction without play. The structural unit further including a second material connection is provided between the graduation carrier and the mount.

Accordingly, this structural unit for a rotary encoder includes a positioning element, which is fastened to a graduation carrier by a material connection, in particular an adhesive connection. The positioning element that bears the graduation carrier is disposed in a recess in a mount, and the recess positions the positioning element in the radial direction by forming a play-free fit for the positioning element in the radial direction. For stably fastening the graduation carrier on the mount, a material connection, in particular an adhesive connection, is likewise provided between the graduation carrier and the mount.

Because the positioning element is connected materially, in particular glued, to a plane face of the graduation carrier that extends perpendicular to the axis of rotation, a parallel alignment of the positioning element and the axis of rotation is ensured. The material connection, in particular the adhesive connection, between the graduation carrier and the mount is effected in a region that is farther away from the axis of rotation in the radial direction than the region where the material connection, in particular adhesive bonding, is effected between the graduation carrier and the positioning element. As a result, a relatively large-area material connection, in particular adhesive bonding, between the graduation carrier and the mount is ensured. This large-area material connection between the graduation carrier and the mount, which is in particular adhesive bonding and which is also radially remote from the axis of rotation, leads to a stable fastening. Even at high accelerations, such a large-area material connection ensures an exact transmission of an angle from the mount—which is preferably a drive shaft of a drive unit, especially of a drive motor—to the graduation carrier.

The distribution of mass of the structural unit is optimized by the embodiment of the present invention, so that a simple, stable connection between the graduation carrier and the mount is attained, even though a slight moment of inertia of the structural unit is maintained.

Thus, the structural unit is especially well suited to measuring rotary motions about the axis of rotation, at which motions high rotary accelerations occur. The structural unit is therefore especially suitable for high-precision position measurement of parts which execute a motion having a rapidly changing direction of motion, such as swiveling mirrors, pick-and-place tools, or bonding tools.

A rotary encoder according to the present invention includes a structural unit that has a graduation carrier fastened to a mount that includes a recess and a positioning element fastened to the graduation carrier by a first material connection. The positioning element is disposed in the recess, and the recess is dimensioned such that the recess positions the positioning element in a radial direction without play. The structural unit further includes a second material connection provided between the graduation carrier and the mount. The rotary encoder further includes a scanning device for scanning the graduation carrier, wherein the structural unit is rotatable about an axis of rotation relative to the scanning device.

A further object of the present invention is to disclose a method for producing a structural unit for a rotary encoder, which permits simple, precise, and stable assembly.

This object is attained according to the present invention by a method for producing a structural unit for a rotary encoder, in which a graduation carrier is fastened to a mount. The method includes producing a first material connection between a graduation carrier and a positioning element. The method also includes introducing the positioning element connected to the graduation carrier into a recess in a mount, the recess positioning the positioning element in a radial direction without play. The method further includes producing a second material connection between the graduation carrier and the mount.

Accordingly, a material connection, in particular an adhesive connection, is established between the graduation carrier and a positioning element. The positioning element that bears the graduation carrier is inserted into a recess in the mount, and the recess positions the positioning element without ply in the radial direction. In this radially positioned position, a further material connection, in particular an adhesive connection, is established between the graduation carrier and the mount.

The term material connection means joining by adhesive bonding, cementing, soldering, or welding.

Adhesive bonding means joining the parts to be joined by an adhesive. An adhesive connection includes the two parts to be joined and the layer of adhesive located between them. The adhesive can be cured by physical processes, such as light, heat, or by chemical reactions. Adhesive bonding has the particular advantage that the parts to be joined can include different materials, and that no heat, or only the slightest amount of heat, is employed. The adhesive method is therefore preferred according to the present invention, since the graduation carrier can then be made of glass or glass ceramic, and the mount can be made of metal.

Advantages and details of the present invention will become apparent from the ensuing description of an exemplary embodiment in conjunction with the accompanying drawings.

DETAILED DESCRIPTION OF THE PREFERRED EMBODIMENTS

Figure 1:
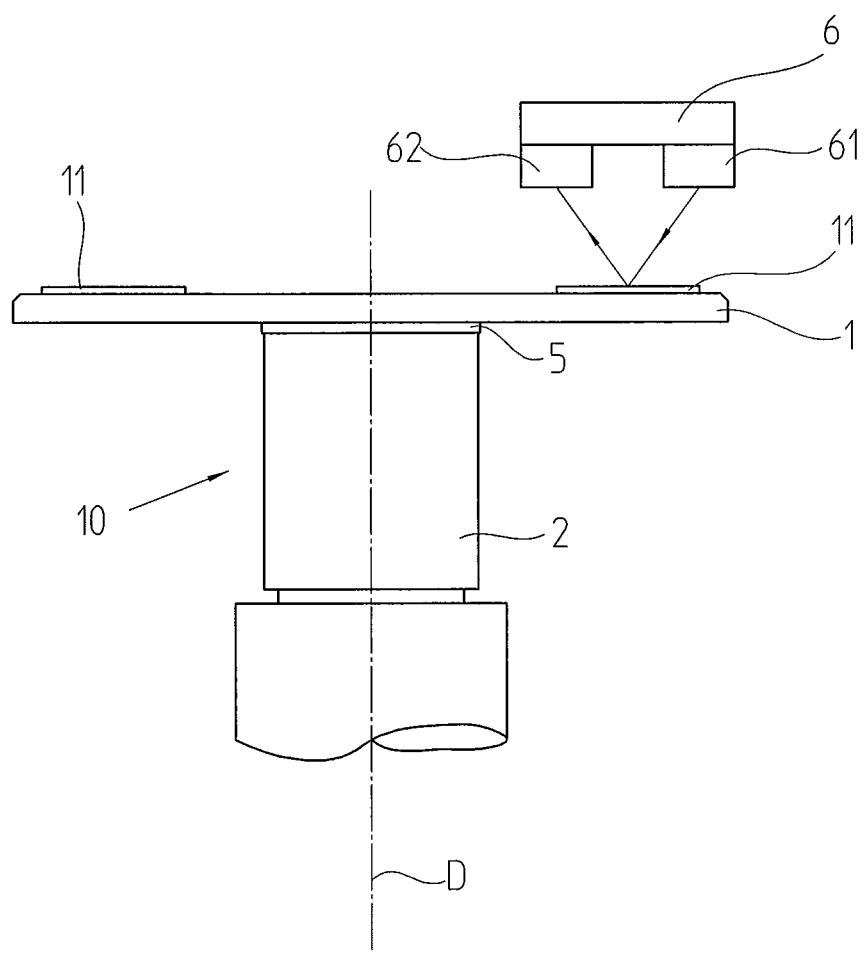
FIG. 1 shows an embodiment of a rotary encoder with a structural unit designed according to the present invention.

In FIG. 1, a rotary encoder with a structural unit 10 designed according to the present invention is shown. The structural unit 10 has a mount 2, in the form of a shaft that is rotatable about an axis of rotation D. The end of the mount 2 has a fastening face, extending perpendicular to the axis of rotation D, for the adhesive fastening of a graduation carrier 1. The adhesive connection between this end of the mount 2 and the underside 13 of the graduation carrier 1 is effected by an adhesive 5.

The graduation carrier 1 has a graduation 11, which is designed so that it can be scanned photoelectrically. For measuring an angle of rotation X about the axis of rotation D, the structural unit 10 is supplemented with a scanning device 6. This scanning device 6 has a light source 61, which emits a beam of light that strikes the graduation 11, where it is modulated as a function of position upon a rotation of the structural unit 10 relative to the scanning device 6. This light modulated as a function of position is reflected and strikes a light receiver 62 of the scanning device 6.

The structural unit 10 of the rotary encoder will now be described in further detail in conjunction with FIGS. 2-4.

Figure 2:
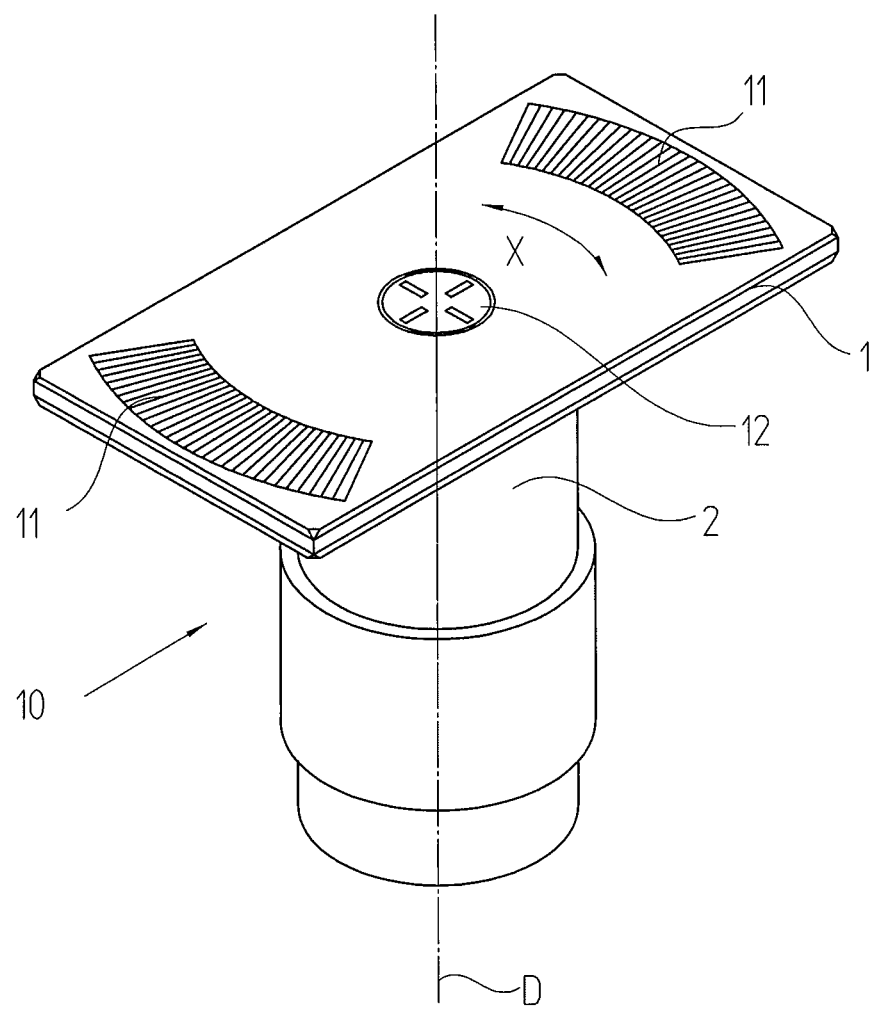
FIG. 2 shows the structural unit of the rotary encoder of FIG. 1 in perspective.
Figure 3:
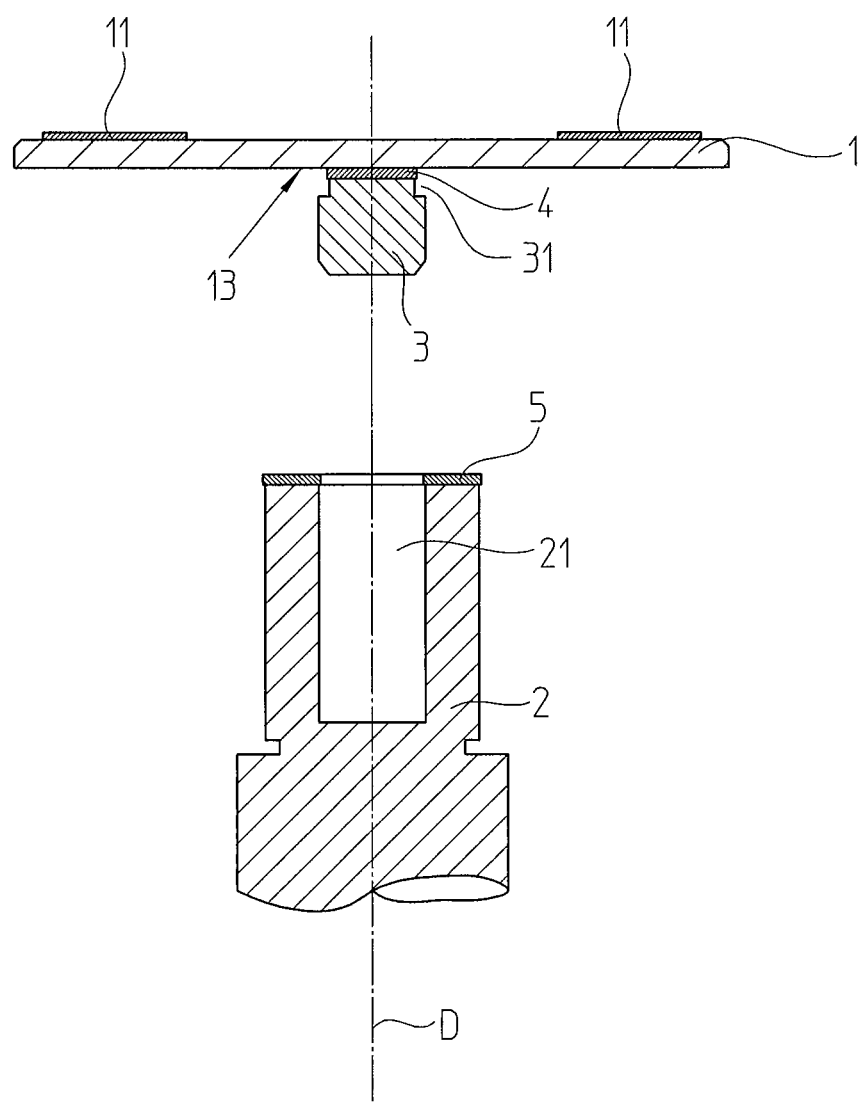
FIG. 3 shows the components of the structural unit of FIGS. 1-2 in section and during their assembly.

As can be seen in FIG. 2, the graduation carrier 1 in this example is embodied in rectangular form. The graduation 11 is not embodied over the entire circumference, since a position measurement is made over only a fraction of 360°, such as 15°. Instead of the rectangular graduation carrier 1, however, a circular graduation carrier can be used that has a graduation over the full 360°, to make a position measurement over one full revolution possible.

The graduation carrier 1 is disk-like or plate-like, with two plane surfaces extending parallel to one another. The graduation carrier 1 preferably includes a transparent material, in particular glass or glass ceramic. The graduation 11 is applied to one of the two parallel surfaces of the graduation carrier 1 in the form of a reflective, photoelectrically scannable structure, which may be an amplitude structure or a phase structure. The graduation 11 is a radial graduation, the center of which is located in the axis of rotation D. Instead of the reflective graduation 11, a graduation that can be scanned using transmitted light can also be provided on the graduation carrier 1. The graduation 11 may be an incremental graduation for relative measurement of a position, or a code for absolute position measurement.

The method for producing the structural unit 10 will now be described in further detail, in terms of the sectional view of the structural unit 10 shown in FIGS. 3 and 4.

As the first method step, a preferably pin-like positioning element 3 is glued to the graduation carrier 1 in the center of the radial graduation 11—that is, in the axis of rotation D. This adhesive connection between a surface 13 of the graduation carrier 1, extending perpendicular to the axis of rotation D, and a face end of the positioning element 3 extending parallel to that surface of the graduation carrier, is effected by an adhesive 4. This adhesive 4 is provided as a thin axial layer between the face end of the positioning element 3 and the surface 13, extending perpendicular to the axis of rotation D, of the graduation carrier 1. That is, two-dimensional adhesive bonding is done, in which no fastening hole in the graduation carrier 1 is required. The two-dimensional connection between an end face of the mount 2 and the underside 13, extending parallel to it, of the graduation carrier 1 ensures a parallel alignment of the positioning element 3 with the axis of rotation D of the graduation carrier 1.

The adhesive 4 can either be applied to the face end of the positioning element 3 or to the underside 13 of the graduation carrier 1 before the graduation carrier 1 and the positioning element 3 are joined, or the adhesive 4 is inserted laterally against the parts 1 and 3 that have already been pressed against one another. For easy introduction of the adhesive 4, the positioning element 3 can also have a bore, extending parallel to the axis of rotation D, so that the adhesive can be introduced from behind into the bore, in the direction of the surface 13 of the graduation carrier 1.

For aligning the positioning element 3 exactly with the center of the radial graduation 11, a marking 12 on the graduation carrier 1 can be used, embodied as crosshairs or as a ring marking. This marking 12 is preferably applied to the graduation carrier 1 along with the graduation 11 in a joint method step and, thus, has a fixedly specified association with the graduation 11.

In the next method step, the connection of the graduation carrier 1 and the mount 2 is made. To that end, a recess 21 extending parallel to the axis of rotation D and in particular disposed centrally, is provided in the mount 2, and the positioning element 3 bearing the graduation carrier 1 is inserted into it. The recess 21 is dimensioned in the radial direction (perpendicular to the axis of rotation D) in such a way that it forms a play-free fit for the positioning element 3. The depth of the recess 21 in the direction of the axis of rotation D is selected such that once the positioning element 3 has been inserted into the recess 21, an adhesive connection between the mount 2 and the graduation carrier 1 is made possible, specifically between an end face, extending perpendicular to the axis of rotation D, of the mount 2 and the surface 13, extending parallel to that end face, of the graduation carrier 1. As shown in FIG. 3, to that end, an adhesive 5 is introduced between the annular end face of the mount 2 and the underside 13 of the graduation carrier 1, so that an adhesive layer that is thin in the axial direction develops.

Figure 4:
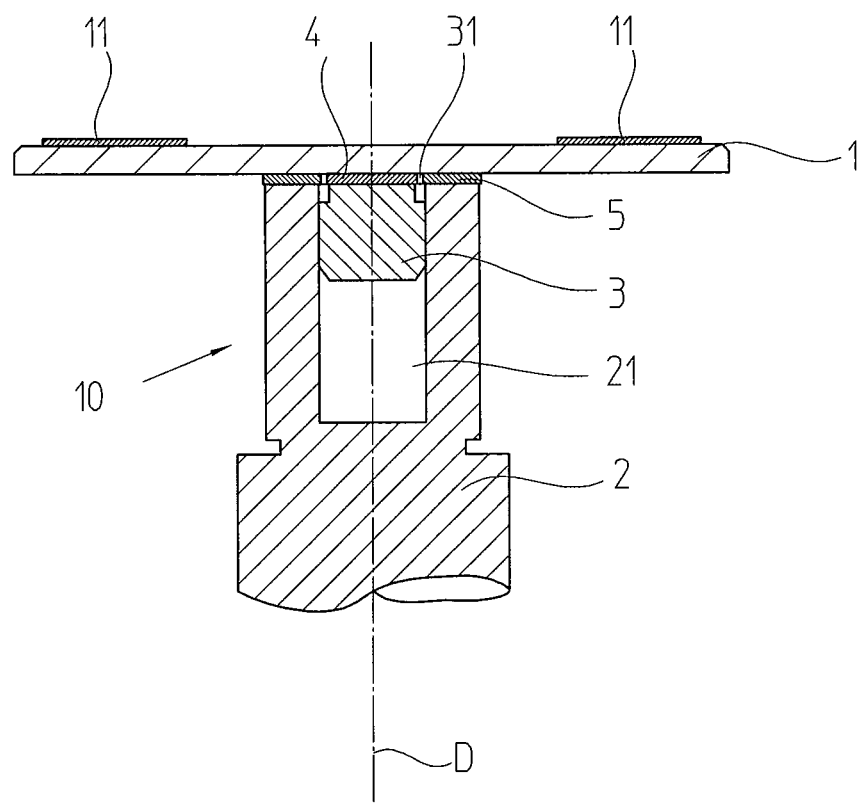
FIG. 4 shows the completed structural unit of FIGS. 2 and 3 in section.

In FIG. 4, the completely assembled structural unit 10 is shown in section. By the structural unit 10 designed according to the present invention, it is now possible to affix the graduation carrier 1 onto a mount 2, such as a drive shaft, especially simply, without special adjusting tools. The manufacturer of the graduation carrier 1 can preconfigure it together with the positioning element 3. This preconfigured component can then be connected by the manufacturer of a drive unit, especially of a drive motor, to a drive shaft, without requiring complicated assembly operations. The positioning element 3, in combination with the precisely fitting recess 21, assures an exact radial association between the graduation carrier 1 and the mount 2, and thus also between the graduation 11 and the axis of rotation D. The adhesive connection with the adhesive 5 assures a stable nonpositive engagement between the graduation carrier 1 and the mount 2, which is preferably the aforementioned drive shaft of a drive unit, especially of a drive motor.

The adhesive 5 is preferably an adhesive that is curable by radiation, especially an adhesive that cures by irradiation with UV light. As a result, it is possible for the adhesive 5 to be cured through the graduation carrier 1 by UV light. To that end, the graduation carrier 1 is made of a material that is transparent to UV light, in particular glass or glass ceramic.

The adhesive 4, too, is preferably an adhesive which is curable by radiation and which is irradiated through the graduation carrier 1 with UV light and thereby cured.

The use of adhesives 4, 5 that are curable by radiation, in particular UV radiation, has the advantage of purposeful and fast curing.

As shown particularly in FIG. 4, the positioning element 3 has a groove 31. This groove 31 can serve, on the one hand, for purposefully introducing the adhesive 4 between the positioning element 3 and the graduation carrier 1 and, on the other hand, it can serve as a pocket for receiving excess adhesive 4 or 5. For this purpose, it is also possible merely to provide a chamfer, instead of the groove 31, on the positioning element and/or on the mount 2. For receiving adhesive 4, a recess may also be provided in the positioning element 3, as proposed for example in EP 0 386 268 B1 mentioned above. A recess for receiving adhesive can be provided on the face end of the mount 2 as well.

The graduation 11 in the example shown is photoelectrically scannable, since this scanning principle ensures high-precision position measurement. However, the present invention is not limited to this; for example, the graduation can also be designed to be scannable magnetically, capacitively, or inductively.

The foregoing description is provided to illustrate the present invention, and is not to be construed as a limitation. Numerous additions, substitutions and other changes can be made to the invention without departing from its scope as set forth in the appended claims.

I claim:

1. A structural unit for a rotary encoder to measure rotary motions about an axis of rotation, comprising:
   a graduation carrier made of glass fastened to a mount that includes a recess;
   a positioning element fastened to said graduation carrier by a first material connection, wherein said first material connection is an adhesive connection, which is embodied between said graduation carrier and said positioning element by a first adhesive that is disposed axially between said graduation carrier and said positioning element, and wherein said positioning element is disposed in said recess, and said recess is dimensioned such that said recess positions said positioning element in a radial direction perpendicular to said axis of rotation without play; and
   a second material connection is provided between said graduation carrier and said mount, wherein said second material connection is an adhesive connection radially remote from said axis of rotation and with a second adhesive that is disposed axially between 1) an end face of said mount that extends perpendicular to said axis of rotation and 2) a surface of said graduation carrier extending parallel to said end face of said mount.

2. The structural unit as defined by claim 1, wherein said first adhesive is curable by UV radiation.

3. The structural unit as defined by claim 1, wherein said second adhesive is curable by UV radiation.

4. The structural unit as defined by claim 1, wherein said graduation carrier comprises a material that is transparent to UV radiation.

5. The structural unit as defined by claim 1, wherein said mount is a drive shaft of a drive unit.

6. The structural unit as defined by claim 1, wherein said second material connection assures an exact radial association between said graduation carrier and said mount.

7. The method as defined by claim 1, wherein said second material connection assures an exact radial association between said graduation carrier and said mount.

8. A rotary encoder comprising:
   a structural unit for a rotary encoder to measure rotary motions about an axis of rotation, said structural unit comprising:
      a graduation carrier made of glass fastened to a mount that includes a recess;
      a positioning element fastened to said graduation carrier by a first material connection, wherein said first material connection is an adhesive connection, which is embodied between said graduation carrier and said positioning element by an adhesive that is disposed axially between said graduation carrier and said positioning element, and wherein said positioning element is disposed in said recess, and said recess is dimensioned such that said recess positions said positioning element in a radial direction perpendicular to said axis of rotation without play; and
      a second material connection is provided between said graduation carrier and said mount, wherein said second material connection is an adhesive connection radially remote from said axis of rotation and with a second adhesive that is disposed axially between 1) an end face of said mount that extends perpendicular to said axis of rotation and 2) a surface of said graduation carrier extending parallel to said end face of said mount; and
   a scanning device for scanning said graduation carrier, wherein said structural unit is rotatable about said axis of rotation relative to said scanning device.

9. The rotary encoder as defined by claim 8, wherein said second material connection assures an exact radial association between said graduation carrier and said mount.

10. A method for producing a structural unit for a rotary encoder to measure rotary motions about an axis of rotation, in which a graduation carrier is fastened to a mount, the method comprising:
    producing a first material connection between a graduation carrier and a positioning element, wherein said first material connection is an adhesive connection, which is embodied between said graduation carrier and said positioning element by an adhesive that is disposed axially between said graduation carrier and said positioning element;
    introducing said positioning element connected to said graduation carrier into a recess in a mount, said recess positioning said positioning element in a radial direction perpendicular to said axis of rotation without play; and
    producing a second material connection between said graduation carrier and said mount, wherein said second material connection is an adhesive connection radially remote from said axis of rotation and with a second adhesive that is disposed axially between 1) an end face of said mount that extends perpendicular to said axis of rotation and 2) a surface of said graduation carrier extending parallel to said end face of said mount.

11. The method as defined by claim 10, further comprising curing said adhesive by irradiating said adhesive with UV light through said graduation carrier.

12. The method as defined by claim 10, further comprising curing said second adhesive by irradiating said second adhesive with UV light through said graduation carrier.

* * * * *